Patented Oct. 10, 1922.

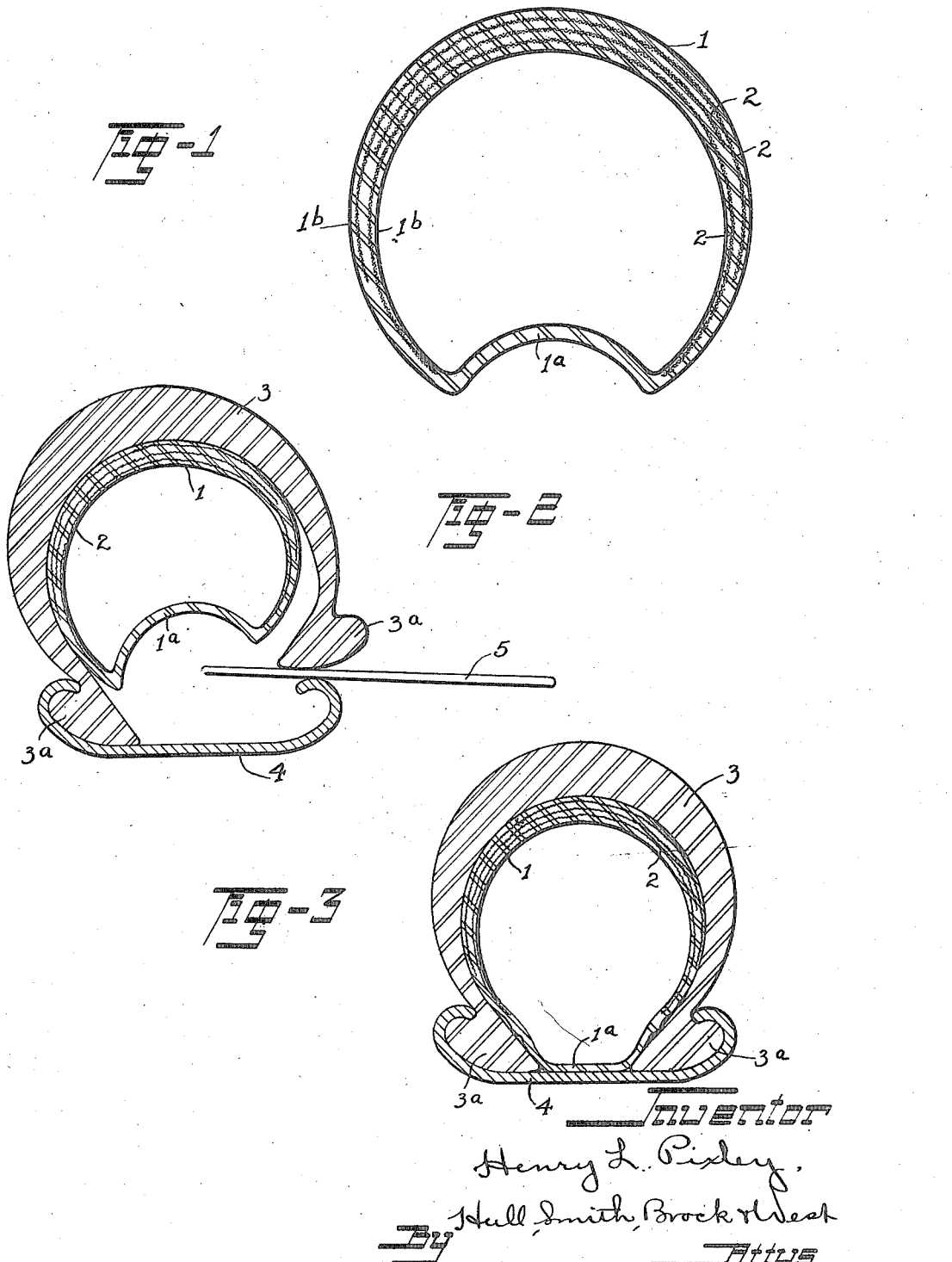

1,431,596

UNITED STATES PATENT OFFICE.

HENRY L. PIXLEY, OF CLEVELAND, OHIO.

INNER TUBE FOR TIRES.

Application filed July 11, 1919. Serial No. 310,161.

*To all whom it may concern:*

Be it known that I, HENRY L. PIXLEY, a citizen of the United States, residing at Cleveland, in the county of Cuyahoga and State of Ohio, have invented a certain new and useful Improvement in Inner Tubes for Tires, of which the following is a full, clear, and exact description, reference being had to the accompanying drawings.

This invention relates to an improved inner tube for pneumatic tires such as are used on automobiles, motorcycles, and the like, and has for its objects the production of a very durable tube which is practically immune from puncture by penetration and capable of withstanding a very high internal pressure thus minimizing the liability of "blow outs;" and which is so constructed that, when deflated its inner side—or that which reposes adjacent the rim when the tire is mounted—automatically contracts within the cross-sectional dimension of the tire so as to insure against the tubes being pinched and thereby injured when applying the casing or shoe containing the tube to a rim by the tire irons usually employed for such purpose.

To these ends I thicken and reenforce the wall of the tube throughout the greater portion of its transverse circumference, leaving a part of the wall, preferably that which reposes next to the rim when the tire is in use, free from the reenforcing means or fabric, so that such part is at liberty to stretch, allowing the tube to expand under pressure and thoroughly fill the casing or shoe; and the tube is molded or formed in such a way that when deflated the inner side tends to retract within the cross sectional dimension of the tube so as to actually increase the inner diameter of the annular tube.

In the accompanying drawing I have illustrated an embodiment of my invention and while I shall proceed to describe the present construction in detail, it will be understood that I do not limit myself to these structural details further than required by the terms of the appended claims.

In the drawing, Fig. 1 is a transverse section through my improved tube; Fig. 2 shows the tube inside a casing that is being placed upon a rim by means of a tire iron; and Fig. 3 shows the parts of Fig. 2 properly assembled and the tire in inflated condition.

Referring now to the cross-section of Fig. 1, the tube 1 is reenforced by a suitable number of layers 2 of fabric or the like throughout the greater portion of its transverse circumference, the reenforcing layers being arranged so that there is a greater thickness of reenforcement and rubber within the zone which is disposed adjacent the tread of the shoe or casing 3 when the parts are assembled for use, than elsewhere. The inner portion of the tube, that designated 1$^a$, is free from any reenforcement, wherefore it is elastic, and the tube is formed so that such portion tends to contract within the cross-sectional dimension of the tire, as illustrated in Figs. 1 and 2.

When the tube is placed within a casing and the latter is sprung upon a rim, the doing of which is illustrated in Fig. 2, and the tube thereafter inflated, the tube assumes the shape and position indicated in Fig. 3, the portion 1$^a$ expanding to fill in the space between the beads 3$^a$ of the casing and engage against the surface of the rim 4 therebetween, the transverse circumference of the tube increasing to that of the internal diameter of the shoe or casing.

With the portion of the tube which reposes within the exposed part of the shoe or casing—the part beyond the flanges of the rim—reenforced as described, it is obvious that the same would be difficult of puncture, for besides the reenforcement of the tube resisting the sharp point or edge of an object projected through the wall of the shoe or casing from penetrating the wall of the tube, the tube would yield because of the greater flexibility as compared to that of the casing sufficiently to follow the point or edge of the object inward, thus offering little resistance to the inward movement of the object and saving the tube from puncture. Being reenforced as it is throughout the area of the tread and side walls of the shoe the tube would be very considerably less likely to "blow-out" than the usual type of tubes that contain no reenforcement.

By reason of the natural tendency of the portion 1$^a$ of the tube to retract within the cross-sectional dimension of the tube, such portion is entirely out of the way of the tire iron 5 as it is manipulated in the application of the shoe or casing 3 to the rim 4. This feature of the invention, therefore, obviates a very common difficulty, to wit: that of pinching the tube between the inner end of the tire iron and rim when applying the casing, such usually resulting in serious injury to the tube as the cutting of it.

Preferably the entire inner and outer surfaces of the tube are coated with a layer of so-called "new rubber," as indicated by the heavy black outlines of Fig. 1, the coating being designated 1<sup>b</sup> in said figure; and the external coating, engaging the inner wall of the shoe or casing, prevents the tube from creeping within the shoe because of the natural tendency of new rubber to cling to a surface and resist slipping.

Having thus described my invention, what I claim is:

1. As a new article of manufacture, a removable inner tube for tires having a reentrant portion extending about its inner side, the outer side portion of the tube being relatively stiff and tending normally to contract the reentrant portion and impart to it a material depth thereby to provide clearance for a tire iron.

2. As a new article of manufacture, a removable inner tube for tires having a reentrant portion extending about its inner side, the outer side portion being of greater thickness than the inner side and having layers of reenforcing material embedded and consolidated therewithin, whereby the outer side portion is rendered relatively stiff, such portion being so shaped as to tend normally to contract the reentrant portion and impart to it a material depth.

In testimony whereof, I hereunto affix my signature.

HENRY L. PIXLEY.